United States Patent
Stöttinger et al.

(10) Patent No.: US 11,811,922 B2
(45) Date of Patent: Nov. 7, 2023

(54) KEY GENERATION DEVICE, A VEHICLE-INTERNAL COMMUNICATION SYSTEM, AND A METHOD FOR THE VEHICLE-INTERNAL MANAGEMENT OF CRYPTOGRAPHIC KEYS

(71) Applicant: Continental Teves AG & Co. OHG, Frankfurt am Main (DE)

(72) Inventors: Marc Sebastian Patric Stöttinger, Oestrich-Winkel (DE); Patrick Thomas Michael Klapper, Weiterstadt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 17/248,701

(22) Filed: Feb. 3, 2021

(65) Prior Publication Data
US 2021/0167956 A1    Jun. 3, 2021

Related U.S. Application Data

(63) Continuation of application No. PCT/EP2019/070139, filed on Jul. 25, 2019.

(30) Foreign Application Priority Data

Aug. 3, 2018    (DE) ..................... 10 2018 213 038.8

(51) Int. Cl.
*H04L 9/08* (2006.01)
(52) U.S. Cl.
CPC .......... *H04L 9/0861* (2013.01); *H04L 9/0819* (2013.01); *H04L 9/0891* (2013.01); *H04L 9/0897* (2013.01); *H04L 2209/84* (2013.01)

(58) Field of Classification Search
CPC ... H04L 9/0861; H04L 9/0819; H04L 9/0897; H04L 2209/84
(Continued)

(56) References Cited

U.S. PATENT DOCUMENTS 10,009,325 B1    6/2018  David et al.
10,218,499 B1 *  2/2019  El Idrissi ................ G06F 21/44
(Continued)

FOREIGN PATENT DOCUMENTS

CN    103996227 A     8/2014
DE    102011002713 A1  7/2012
(Continued)

OTHER PUBLICATIONS

German Search Report dated Jul. 5, 2019 for the counterpart German Patent Application No. 10 2018 213 038.8.
(Continued)

*Primary Examiner* — Bryan F Wright

(57) ABSTRACT

A key generation device for a vehicle-internal communication system and a method for the vehicle-internal management of cryptographic keys comprises providing at least one secret for a vehicle-internal key generation device and generation of at least one new cryptographic key by the vehicle-internal key generation device on the basis of the at least one secret. The generation and providing of the at least one new cryptographic key takes place autonomously and is triggered by a key-exchange event, or a combination of key-exchange events. The key-exchange event may be one of a vehicle-internal change, an environmental change and a security key.

18 Claims, 4 Drawing Sheets

(58) Field of Classification Search
USPC .......................................................... 380/44
See application file for complete search history.

(56) References Cited

U.S. PATENT DOCUMENTS

| | | | | |
|---|---|---|---|---|
| 11,171,776 | B2* | 11/2021 | Usui | ................ H04L 9/083 |
| 2007/0127719 | A1* | 6/2007 | Selander | ............ H04L 9/0891 |
| | | | | 380/277 |
| 2008/0192929 | A1 | 8/2008 | Knechtel | |
| 2012/0318785 | A1 | 12/2012 | Kushihashi et al. | |
| 2014/0232521 | A1 | 8/2014 | Kawamura et al. | |
| 2016/0272154 | A1 | 9/2016 | Sanji et al. | |
| 2017/0305368 | A1 | 10/2017 | Markham | |
| 2017/0310674 | A1 | 10/2017 | Markham | |
| 2018/0076959 | A1 | 3/2018 | Komano et al. | |
| 2018/0227120 | A1 | 8/2018 | Takemori et al. | |
| 2018/0295147 | A1* | 10/2018 | Haga | ................ G07C 5/0808 |
| 2019/0173862 | A1* | 6/2019 | Kim | .................. H04L 9/3242 |
| 2020/0153625 | A1* | 5/2020 | Schaap | ............. H04L 9/0819 |

FOREIGN PATENT DOCUMENTS

| | | | |
|---|---|---|---|
| DE | 102012209445 A1 | 12/2013 | |
| DE | 102015219989 A1 | 4/2017 | |
| JP | H06152592 A | 5/1994 | |
| JP | 2005003882 A | 1/2005 | |
| JP | 2005203882 A | 7/2005 | |
| JP | 2008271506 A | 11/2008 | |
| JP | 2013004247 A | 1/2013 | |
| JP | 2013055420 A | 3/2013 | |
| JP | 2013234519 A | 11/2013 | |
| JP | 2015085899 A | 5/2015 | |
| JP | 2016038202 A | 3/2016 | |
| JP | 2017034646 A | 2/2017 | |
| JP | 2017188959 A | 10/2017 | |
| KR | 20180045901 A | 5/2018 | |
| KR | 20180049523 A | 5/2018 | |
| WO | 2006089584 A1 | 8/2006 | |

OTHER PUBLICATIONS

International Search Report and the Written Opinion of the International Searching Authority dated Oct. 9, 2019 for the counterpart PCT Application No. PCT/EP2019/070139.
Notice of Reasons for refusal (original and translated), dated Apr. 6, 2022 from corresponding Japanese patent application No. 2021-505801.
Korean Office Action dated Oct. 17, 2022 for the corresponding Korean Patent Application No. 10-2021-7002693.
Alfred J. Menezes, Paul C. van Oorschot, Scott A. Vanstone / Handbook of Applied Cryptography.
Chinese Office Action dated Apr. 27, 2023 for the counterpart Chinese Patent Application No. 201980051810.0.

* cited by examiner

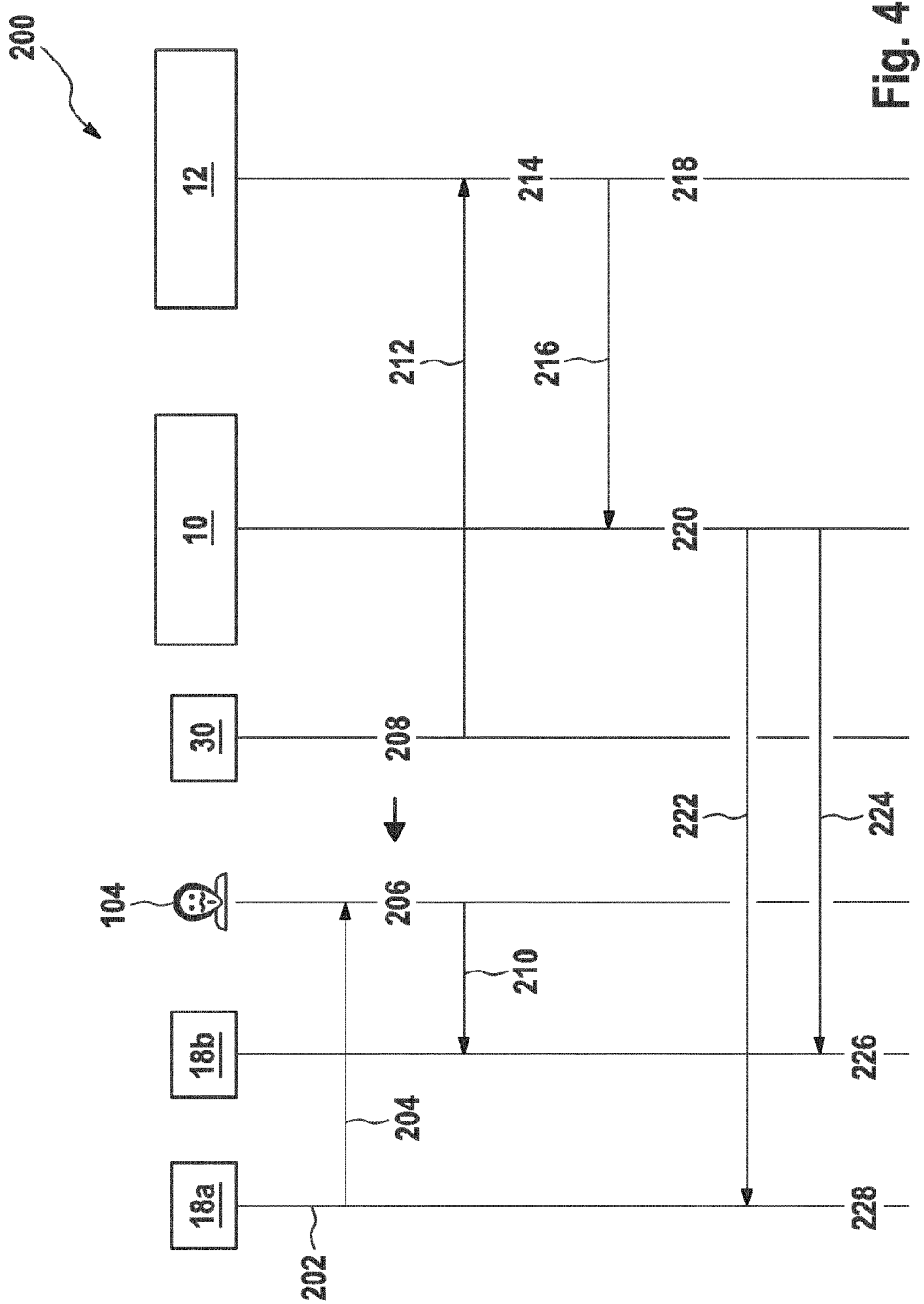

KEY GENERATION DEVICE, A VEHICLE-INTERNAL COMMUNICATION SYSTEM, AND A METHOD FOR THE VEHICLE-INTERNAL MANAGEMENT OF CRYPTOGRAPHIC KEYS

CROSS REFERENCE TO PRIOR APPLICATIONS

Cross-Reference to Related Applications

This application claims the benefit of PCT Application PCT/EP2019/070139, filed Jul. 25, 2019, which claims priority to German Application DE 10 2018 213 038.8, filed Aug. 3, 2018. The disclosures of the above applications are incorporated herein by reference.

TECHNICAL FIELD

The invention relates to a method for the vehicle-internal management of cryptographic keys, and also relates to a key-generating device for use in a vehicle-internal communication system.

BACKGROUND

Cryptographic keys are used in vehicles for cryptographically securing the vehicle-internal communication between different vehicle-internal control devices, and for cryptographically securing the integrity of the software of the vehicle-internal control devices.

In order that appropriate cryptographic security can be maintained over the service life of a vehicle, the generation and distribution of new cryptographic keys within a vehicle-internal communication system is needed regularly. The expression "rekeying" has become accepted in this context.

Various approaches are known for introducing new key material into a vehicle-internal communication system. Cryptographic keys are, for example, downloaded by a technician in a workshop by means of a test unit directly into the vehicle-internal communication system. The transmission of a command that initiates the key generation to a key-generating vehicle-internal control device is furthermore known. This can, for example, be performed by an authorized technician in a workshop, or by a backend through a secured end-to-end connection to the vehicle. Transmitting key material directly from a backend via a secured end-to-end connection to the vehicle is furthermore known.

The known solutions however partially entail significant problems. While downloading key material or commands that initiate the key generation by a technician, the vehicle must be made physically available. There is thus a negative impact on usage for the user of the vehicle. When the rekeying takes place in the context of servicing work that is to be carried out regularly at the vehicle, long periods of key usage can result, so that the internal communication security cannot be readily ensured. On top of this, it is not possible to rule out the possibility that third parties have an influence on the workshop personnel involved in the download of key material.

During the transmission of key material or of control commands that initiate the key generation using a secured Internet connection, there is always a risk of compromise, so that secure rekeying cannot be implemented either in this way.

Therefore, increasing the security during the generation and provision of cryptographic keys for vehicle-internal control units is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle-internal key generation device makes at least one secret available and at least one new cryptographic key is generated by the vehicle-internal key generation device on the basis of the at least one secret.

The device makes use of the recognition that as a result of the vehicle-internal key generation, the need for directly introducing the key, for example by means of a technician or via a backend, is not necessary, so that an associated risk of compromise is eliminated. The at least one secret that is to be introduced into the vehicle-internal communication system may not be used for key generation without the knowledge of supplementary generation parameters such as, for example, salt parameters or seed parameters. An attack aimed at the process of providing the at least one secret is thus unsuitable for impairing the communication security within the vehicle. The security of the rekeying process is increased in this way.

The key generation device for example uses a key derivation function such as, for example, PBKDF2 to generate the at least one key. The at least one secret can, for example, be a secret key, a password or a passphrase. The at least one secret can be downloaded, for example initially, to the key generation device and/or conveyed by means of a key exchange and/or a key agreement method such as, for example, the Diffie-Hellman or Elgamal. A plurality of secrets can also be provided to the vehicle-internal key generation device. The key generation device can also generate multiple new cryptographic keys on the basis of the one or of the plurality of secrets.

The at least one new cryptographic key may be provided to at least one vehicle-internal control device. Alternatively or in addition, the at least one new cryptographic key is used by the vehicle-internal control device in cryptographic and/or non-cryptographic security measures. The at least one new cryptographic key may also be made available to a plurality of vehicle-internal control devices, or agreed between them, by means of a key-sharing process, in particular using a key-exchange algorithm, wherein the plurality of vehicle-internal control devices can then use the at least one new cryptographic key in cryptographic and/or non-cryptographic security measures. The vehicle-internal control device may, for example, be an electronic control unit (ECU). A cryptographic security measure relates, for example, to the encryption of messages. A non-cryptographic security measure relates, for example, to the signing of messages. For example, one or a plurality of secrets are made available per vehicle-internal control device to the vehicle-internal key generation device, so that device-specific cryptographic keys can be generated on the basis of the respective secret or of the respective secrets, which are assigned to the respective vehicle-internal control devices.

In addition, the generation of the at least one new cryptographic key and/or the provision of the at least one new cryptographic key may be triggered by a key-exchange event or a combination of key-exchange events, and/or occurs autonomously. The key-exchange event can be a security event (security incident), such as for example a firewall alarm, an intrusion detection, a failed identity check or a certificate rule infringement (false identity proof via own signed backend certificate). The key-exchange event may be an environmental change, such as the change in the position, the change in the route and/or the exceeding of physical limit parameters. The key-exchange event may furthermore also be exceeding of a time limit. The key-exchange event may, moreover, be a vehicle-internal change, which can for example be ascertained by means of anomaly detection.

The key-exchange event may captured by a vehicle-internal control unit, wherein the control unit initiates the generation of the at least one new cryptographic key and/or the provision of the at least one new cryptographic key. The vehicle-internal control unit thus functions as a rekeying manager. The method may comprise the capture of a key-exchange event or a combination of key-exchange events by the vehicle-internal control unit. The key generation device and the control unit may be separate electronic modules, or can be integrated into a common electronic module.

In another embodiment, the control unit monitors the key generation carried out by the key generation device and/or adapts the key generation carried out by the key generation device. Alternatively or in addition, the control unit monitors the provision and/or the distribution of new cryptographic keys to one or a plurality of control devices and/or adapts the provision and/or the distribution of new cryptographic keys to one or a plurality of control devices. The rekeying process can be modified dynamically in that the control unit permits an adaptation of the key generation and/or an adaptation of the key distribution. The control unit may specify the secrets to be used for the key generation to the key generation device. Through a change to the specification it is possible to ensure that one or a plurality of secrets are no longer used for key generation, for example after it has been ascertained that they have been compromised. In addition to this, the control unit can specify the parameters to be used in the context of the key derivation function to the key generation device. New keys can thus be generated on the basis of an unchanged secret through a change to the parameters.

In one embodiment, key generation parameters are provided to a vehicle-external computer system which allow the vehicle-external computer system to generate at least one cryptographic key that is used by a vehicle-internal control device. Alternatively or in addition, the method comprises the generation, by the external computer system, of at least one cryptographic key that is used by a vehicle-internal control device. The external computer system can, for example, be a backend that is operated by the vehicle manufacturer or by a third-party supplier. The provision of the key generation parameters can, for example, comprise the transmission of the key generation parameters from the vehicle-internal communication system to the vehicle-external computer system, in particular using a secured Internet connection. For example, the at least one secret that was provided to the vehicle-internal key generation device for key generation is also known to the vehicle-external computer system. On the basis of the key generation parameters provided and of the at least one secret, the vehicle-external computer system is capable of generating corresponding cryptographic keys that may also be used in the context of the vehicle-internal communication system.

Authorization information may be made available for the vehicle-internal key generation device, and the generation of the at least one new cryptographic key by the vehicle-internal key generation device also takes place on the basis of the authorization information. The authorization information may also be known as credentials, and can, for example, comprise a counter, a token and/or authorization credentials. The authorization information may be made available by the control unit to the key generation device.

Further, a key generation device may comprise a computing unit that is configured to generate a new cryptographic key on the basis of the at least one secret. The key generation device may configured to be used in the method for vehicle-internal management of cryptographic keys according to one of the embodiments described above.

The object may be further achieved by a vehicle-internal communication system of the type mentioned at the beginning, wherein the communication system is configured to carry out the method for the vehicle-internal management of cryptographic keys according to one of the embodiments described above.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 shows a schematic flow diagram of the method.

DETAILED DESCRIPTION

Figure 1:
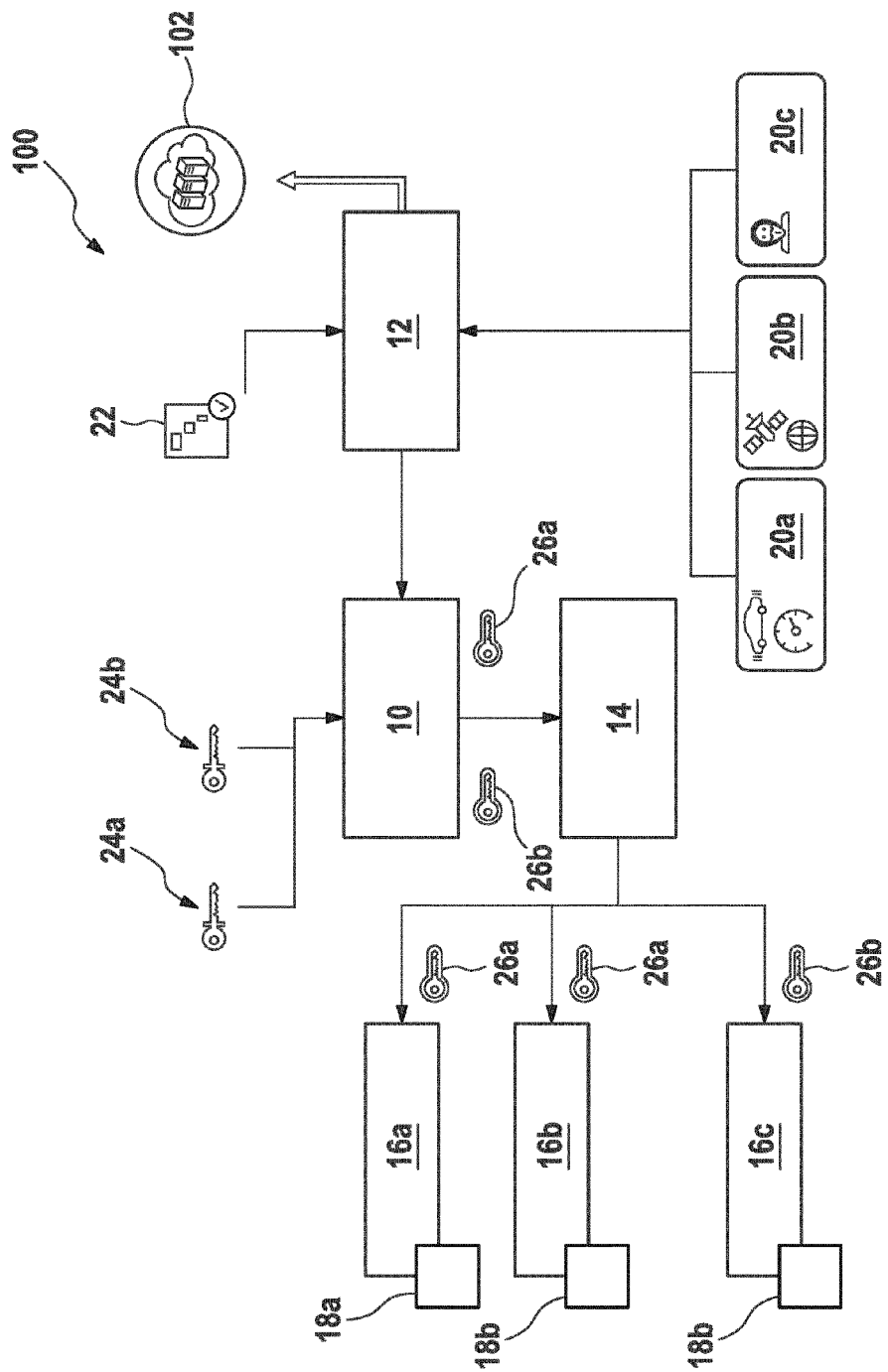
FIG. 1 shows an exemplary embodiment of the communication system in a schematic illustration.

According to FIG. 1, the vehicle-internal communication system 100 comprises a key generation device 10, a control unit 12 and a plurality of, namely three, control devices 18a-18c.

The key generation device 10 comprises a storage device for storing provided secrets 24a, 24b, wherein the secrets 24a, 24b can, for example, be secret keys, passwords or passphrases. The provision of the secrets 24a, 24b for the key generation device 10 can, for example, take place through an initial download during the implementation of the communication system 100 and/or subsequently by means of a key exchange and/or a key agreement method, such as for example Diffie-Hellman or Elgamal.

Authorization information 22 is in addition provided to the key generation device 10 via the control unit 12. The authorization information 22 can also be known as "credentials" and comprises for example a counter, a token and/or authorization credentials.

The key generation device 10 comprises a computing unit that generates cryptographic keys 26a, 26b on the basis of the secrets 24a, 24b and of the authorization information 22. The cryptographic keys 26a, 26b that are generated are provided to a plurality of vehicle-internal control devices 18a-18c via a distribution device 14 using key exchange algorithms. In the exemplary embodiment illustrated, the key generation device 10 generates the cryptographic key 26a on the basis of the secret 24a and the cryptographic key 26b on the basis of the secret 24b. The cryptographic key 26a is provided to the vehicle-internal control devices 18a, 18b. The cryptographic key 26b is provided to the vehicle-internal control device 18c.

The vehicle-internal control devices 18a-18c are designed as electronic control units (ECUs) and use the cryptographic key 26a, 26b provided in the context of cryptographic and non-cryptographic security measures 16a-16c such as the encryption or signing of messages.

The generation of the cryptographic keys 26a, 26b and the provision of the cryptographic keys 26a, 26b that have been generated is triggered by a key-exchange event 20a-20c or a combination of key-exchange events 20a-20c, and takes place autonomously on the occurrence of the key-exchange event 20a-20c or on the occurrence of the combination of key-exchange events 20a-20c.

The key-exchange event 20a-20c is captured by a vehicle-internal control unit 12, so that the control unit 12 also initiates the generation of the new cryptographic keys 26a, 26b as well as the provision of the cryptographic keys 26a, 26b that have been generated. In addition to this, the control unit 12 serves for monitoring the key generation carried out by the key generation device 10 and for adapting the key generation carried out by the key generation device 10.

The key-exchange event 20a-20c can be a vehicle-internal change 20a, an environmental change 20b or a security event 20c (security incident). The vehicle-internal change 20a can be acquired through an anomaly detection. The environmental change 20b can, for example, relate to the change in the position of the vehicle, to the change in the planned driving route or to the exceeding of physical limit parameters. Environmental change 20b can furthermore also relate to time-based changes or limits. The security event 20c can, for example, be a firewall alarm, an intrusion detection, a failed identity check or a certificate rule infringement (false identity proof via own signed backend certificate).

The vehicle-internal communication system 100 is furthermore configured to provide key generation parameters to a vehicle-external computer system 102, for example via an Internet connection. The key generation parameters allow the vehicle-external computer system 102 to generate the cryptographic keys 26a, 26b that are used by the vehicle-internal control devices 18a-18c. This allows the keys 26a, 26b that are generated internally to the vehicle also to be generated outside the vehicle.

Figure 2:
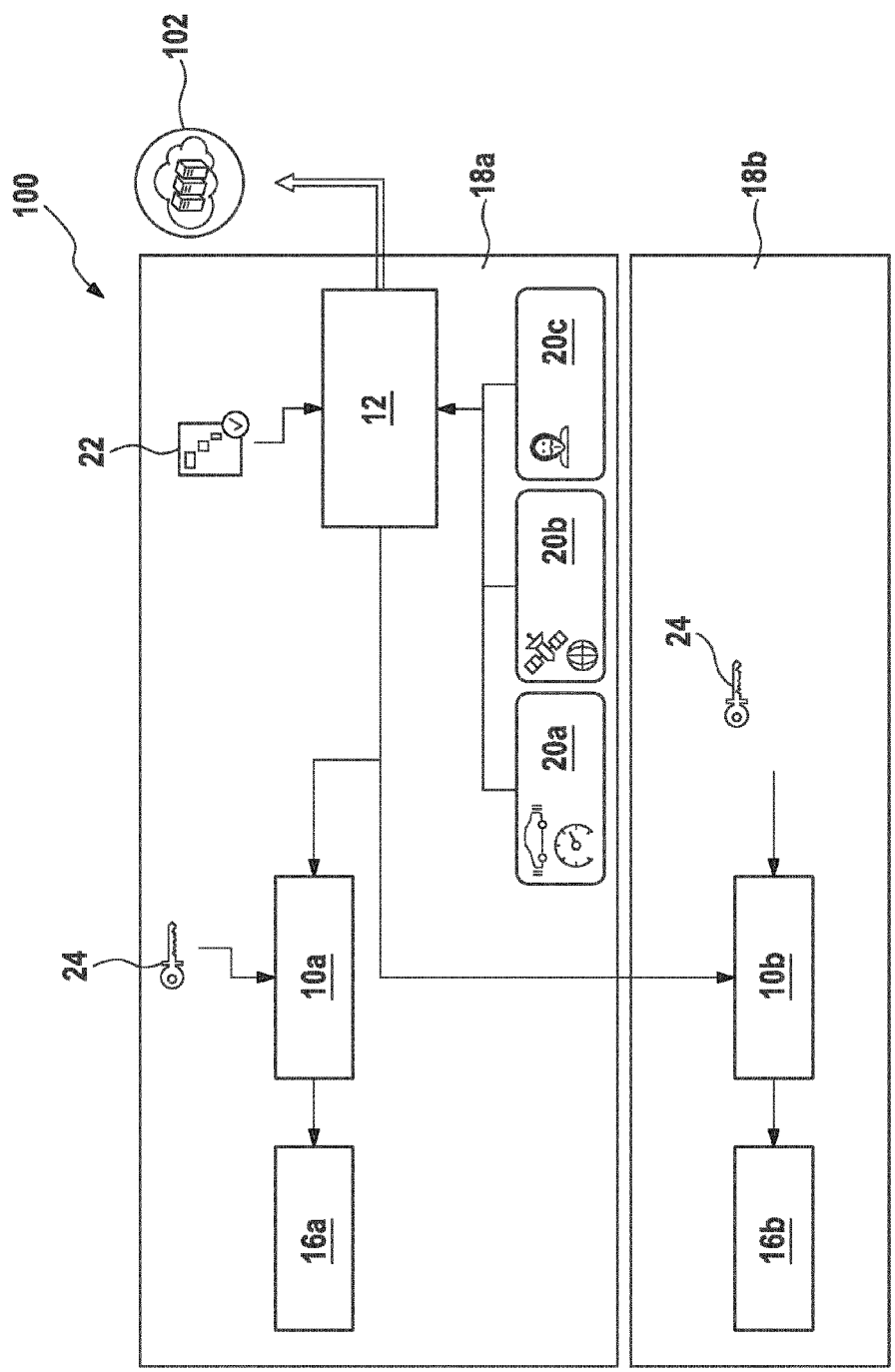
FIG. 2 shows a further exemplary embodiment of the communication system in a schematic illustration.

The communication system 100 illustrated in FIG. 2 comprises two separate key generation devices 10a, 10b, wherein the key generation device 10a is an element of the vehicle-internal control device 18a, and the key generation device 10b is an element of the vehicle-internal control device 18b. The secret 24 is provided to the key generation devices 10a, 10b, wherein the key generation devices 10a, 10b are configured to derive a cryptographic key on the basis of the secret 24, wherein this is directly usable by the respective control device 18a, 18b in the context of security measures 16a, 16b.

The key generation devices 10a, 10b use, for example, a key derivation function to generate the respective keys. As a result of the integration of the key generation devices 10a, 10b into the vehicle-internal control devices 18a, 18b, a distribution of the generated keys is not necessary.

Figure 3:
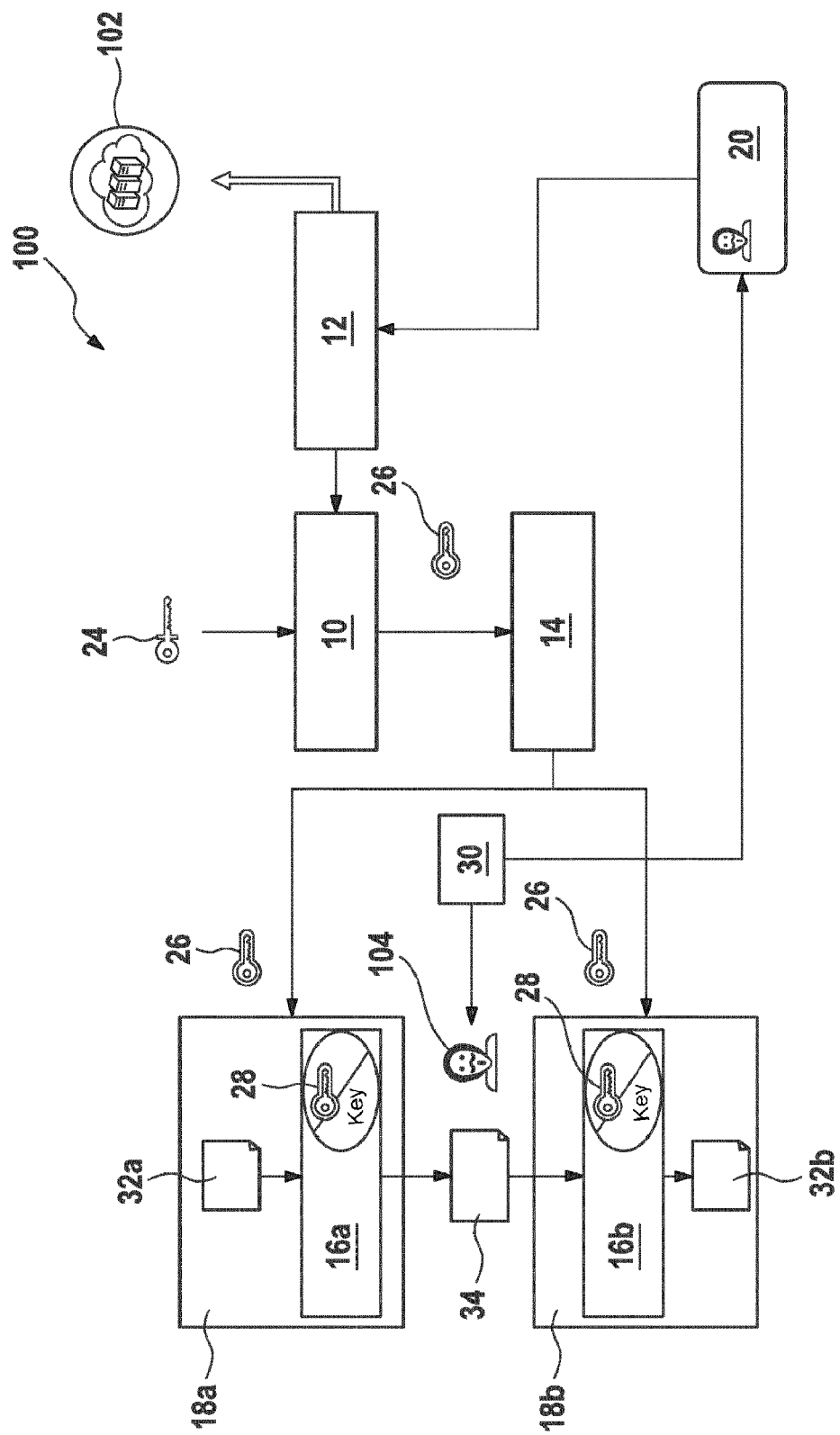
FIG. 3 shows a further exemplary embodiment of the communication system in a schematic illustration.

FIG. 3 shows a vehicle-internal communication system 100 in which two vehicle-internal control devices 18a, 18b, each of which is configured as an electronic control unit (ECU), exchange encrypted and signed messages 32a, 32b with one another. The messages 32a, 32b here comprise an identifier 34 such as, for example, a cipher or a MAC tag. An intrusion detector 30 serves to capture attacks by vehicle-external attackers 104.

It is thus possible to ascertain by way of the intrusion detector 30 whether a security event 20 (security incident) that requires the regeneration of keys has occurred. On the basis of the ascertained security event 20, the control unit 12 initiates the generation and distribution of a new cryptographic key 26 that the control devices 18a, 18b can use for further communication with one another. In this way, an exchange of the old key 28 for the new key 26 in the case of the control devices 18a, 18b, caused by the detection of an external attack, takes place autonomously.

The flow diagram illustrated in FIG. 4 shows by way of example the method flow 200 during the method for the vehicle-internal management of cryptographic keys.

In step 202, a message is encrypted and signed by a vehicle-internal control device 18a. The message contains an identifier. In step 204, the message is transmitted to the vehicle-internal control device 18b, wherein the message that is addressed to the control device 18b is caught and manipulated in step 206 by the attacker 104. The manipulation is ascertained in step 208 by the vehicle-internal intrusion detector 30, wherein the manipulated message is transmitted in step 210 from the attacker 104 to the vehicle-internal control device 18b.

In step 212, the vehicle-internal control unit 12 is informed by the intrusion detector of the attack on the communication between the control device 18a and the control device 18b. Following this, in step 214 the control unit 12 identifies the cryptographic key used in the communication between the control device 18a and the control device 18b, and initiates the generation of a new cryptographic key by means of a corresponding generation command that is transmitted to the key generation device 10 in step 216. In step 218, a vehicle-external computer system is additionally informed that the cryptographic key previously used for communication between the control device 18a and the control device 18b is invalid from this time on, and that a new key is being generated internally to the vehicle to replace the invalid key.

The key generation device 10 now uses a secret that was provided previously and has been stored in a memory of the key generation device 10 in order in step 220 to generate a new cryptographic key for securing the communication between the control device 18a and the control device 18b. The generated cryptographic key is provided by way of a key distribution process to the control device 18a in step 222 and to the control device 18b in step 224.

In step 228, the control device 18a replaces the cryptographic key that was used previously and is from this time on invalid with the newly generated cryptographic key provided by the key generation device 10. In step 226, the control device 18b replaces the cryptographic key that was used previously and is from this time on invalid with the newly generated cryptographic key provided by the key generation device 10. The communication between the control device 18a and the control device 18b is secured from this time on by means of the newly generated cryptographic key.

The invention thus allows an automatic vehicle-internal elimination of security flaws that is initiated by the identification of a key-exchange event, and does not require any further measures on the part of an external technician or the exchange of data with an external computer system.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for the vehicle-internal management of cryptographic keys comprising:
   providing at least one secret for a vehicle-internal key generation device;
   generating at least one new cryptographic key by the vehicle-internal key generation device on the basis of the at least one secret, the at least one new cryptographic key replacing an old cryptographic key; and
   providing at least one new cryptographic key to a first vehicle-internal control device and a second vehicle-internal control device, wherein the first vehicle-internal control device and the second vehicle-internal control device are configured to replace the old cryptographic key with the at least one new cryptographic key and perform secured communication between each other secured using the at least one new cryptographic key,
   wherein the generation of the at least one new cryptographic key and the providing of the at least one new cryptographic key takes place autonomously triggered by one of:
   one of an environmental change and a security event.

2. The method as claimed in claim 1, further comprising:
   the first vehicle-internal control device and the second vehicle-internal control device performing cryptographic and/or non-cryptographic security measures using the at least one new cryptographic key.

3. The method as claimed in claim 2, further comprising:
   capturing the key-exchange event with a vehicle-internal control unit; and
   initiating with the vehicle-internal control unit one of the generating of the at least one new cryptographic key and the provisioning of the at least one new cryptographic key.

4. The method as claimed in claim 3, further comprising at least one of:
   monitoring of the key generation carried out by the key generation device by the vehicle-internal control unit; and
   adapting the key generation carried out by the key generation device by the vehicle-internal control unit.

5. The method as claimed in claim 3, further comprising at least one of:
   monitoring at least one of the provisioning and the distributing of the at least one new cryptographic key to the first vehicle-internal control device and the second vehicle-internal control device by the control unit; and
   adapting at least one of the provisioning and the distributing of the at least one new cryptographic key to the first vehicle-internal control device and the second vehicle-internal control device by the control unit.

6. The method as claimed in claim 1, further comprising at least one of:
   provisioning of key generation parameters for a vehicle-external computer system that enable the vehicle-external computer system to generate the at least one cryptographic key; and
   generating by the external computer system, of the at least one cryptographic key.

7. The method as claimed in claim 1, further comprising provisioning authorization information for the vehicle-internal key generation device,
   wherein the generation of the at least one new cryptographic key by the vehicle-internal key generation device also takes place on the basis of the authorization information.

8. A key generation device for use in a vehicle-internal communication system, the key generation device comprising:
   a storage device for storing at least one secret;
   and a microprocessor to generate at least one new cryptographic key on the basis of the at least one secret, the at least one new cryptographic key replacing an old cryptographic key,
   and provide at least one new cryptographic key to a first vehicle electronic control unit and a second vehicle electronic control unit,
   wherein the first vehicle electronic control unit and the second vehicle electronic control unit are configured to replace the old cryptographic key with the at least one new cryptographic key and perform secured communication between each other secured using the at least one new cryptographic key,
   wherein the microprocessor is configured to generate the at least one new cryptographic key autonomously triggered by one of, an environmental change and a security event.

9. A vehicle-internal communication system comprising:
   a first vehicle electronic control unit;
   a second vehicle electronic control unit;
   a vehicle-internal key generation device which has software with instructions stored in memory for providing at least one secret, generating at least one new cryptographic key on the basis of the at least one secret, the at least one new cryptographic key replacing an old cryptographic key,
   and providing at least one new cryptographic key to the first vehicle electronic control unit and the second vehicle electronic control unit,
   wherein the first vehicle electronic control unit and the vehicle electronic control unit are configured to replace the old cryptographic key with the at least one new cryptographic key and perform secured communication between each other secured using the at least one new cryptographic key; and a microprocessor,
   wherein the vehicle-internal key generation device is configured to generate and provide the at least one new cryptographic key autonomously triggered by one of: an environmental change and a security event.

10. The vehicle-internal communication system as claimed in claim 9, wherein the first vehicle electronic control unit and the second vehicle electronic control unit are configured to perform cryptographic and/or non-cryptographic security measures using the at least one new cryptographic key.

11. The vehicle-internal communication system as claimed in claim 9, wherein the microprocessor is configured to capture the key-exchange event, and wherein the microprocessor is configured to initiate at least one of the generation of the at least one new cryptographic key and the providing of the at least one new cryptographic key.

12. The vehicle-internal communication system as claimed in claim 11, wherein the microprocessor is configured to monitor the key generation carried out by the key generation device and adapt the key generation carried out by the key generation device.

13. The vehicle-internal communication system as claimed in claim 11, wherein the microprocessor is configured to monitor at least one of the providing and the distribution of the at least one new cryptographic key and adapt at least one of the providing and the distribution of new cryptographic keys to the first electronic control unit and the second electronic control unit.

14. The vehicle-internal communication system as claimed in claim 9, wherein the vehicle-internal key generation device is configured to generate the at least one new cryptographic key on the basis of authorization information.

15. The method as claimed in claim 1, wherein the security event is one of: a firewall alarm, and intrusion detection, a failed identity check and a certificate rule infringement.

16. The method as claimed in claim 1, wherein the environmental change is one of a change in the position of the vehicle, a change in the planned driving route, exceeding of physical limit parameters, time limits, and time-based changes.

17. The vehicle-internal communication system as claimed in claim 9, wherein the security event is one of: a firewall alarm, and intrusion detection, a failed identity check and a certificate rule infringement.

18. The device as claimed in claim 9, wherein the environmental change is one of a change in the position of the vehicle, a change in the planned driving route, exceeding of physical limit parameters, time limits, and time-based changes.

* * * * *